(12) United States Patent
Jeong

(10) Patent No.: US 12,535,709 B2
(45) Date of Patent: Jan. 27, 2026

(54) LIQUID CRYSTAL DISPLAY OF MICRO DISPLAY DEVICE AND A MANUFACTURING METHOD THEREOF

(71) Applicant: RAONTECH, INC., Seongnam-si (KR)

(72) Inventor: Minsu Jeong, Seongnam-si (KR)

(73) Assignee: RAONTECH, INC., Gyeonggi-do (KR)

( * ) Notice: Subject to any disclaimer, the term of this patent is extended or adjusted under 35 U.S.C. 154(b) by 0 days.

(21) Appl. No.: 18/806,382

(22) Filed: Aug. 15, 2024

(65) Prior Publication Data
US 2025/0060638 A1     Feb. 20, 2025

(30) Foreign Application Priority Data

Aug. 16, 2023   (KR) ........................ 10-2023-0107241
Dec. 11, 2023   (KR) ........................ 10-2023-0179154

(51) Int. Cl.
    *G02F 1/1343*      (2006.01)

(52) U.S. Cl.
    CPC .... *G02F 1/13439* (2013.01); *G02F 1/134309* (2013.01); *G02F 1/134363* (2013.01); *G02F 1/134381* (2021.01)

(58) Field of Classification Search
    CPC ........................................ G02F 1/1343–13439
    See application file for complete search history.

(56) References Cited

FOREIGN PATENT DOCUMENTS

| CN | 104483786 A | * | 4/2015 | ......... G02F 1/13439 |
|---|---|---|---|---|
| CN | 106909001 A | * | 6/2017 | ....... G02F 1/134309 |
| CN | 109541860 A | * | 3/2019 | ....... G02F 1/134363 |

* cited by examiner

*Primary Examiner* — Mariceli Santiago
(74) *Attorney, Agent, or Firm* — Foley & Lardner LLP

(57) ABSTRACT

The present invention discloses a liquid crystal display of a micro display device and a manufacturing method thereof. The device includes: a pixel driving circuit output electrode body in which a pixel circuit output voltage unit, a first columnar electrode, and a first layer electrode are sequentially stacked; a first intermetallic dielectric covering a side surface of the pixel driving circuit output electrode body; a third intermetallic dielectric stacked on a top surface of the first intermetallic dielectric and a top surface of the pattern; a second columnar electrode connected to a top surface of the first layer electrode through penetrating the third intermetallic dielectric; and a protective film stacked on a top surface of the second columnar electrode and a top surface of the third intermetallic dielectric. Also, as column-shaped or point-shaped electrodes are used instead of flat electrodes to implement arbitrary electric fields, the direction of the horizontal electric field is arbitrarily designated. This prevents a problem of flat electrodes in which the desired electric field is weakened or not formed.

17 Claims, 18 Drawing Sheets

Prior Art

LIQUID CRYSTAL DISPLAY OF MICRO DISPLAY DEVICE AND A MANUFACTURING METHOD THEREOF

CROSS-REFERENCE TO RELATED APPLICATION

This application is based upon and claims the benefit of priority from Korean Patent Application No. 10-2023-0107241, filed Aug. 16, 2023 and Korean Patent Application No. 10-2023-0179154, filed Dec. 11, 2023, the entire contents of both application are incorporated herein by reference.

TECHNICAL FIELD

The present invention relates to a liquid crystal display of a micro display device. In particular, the present invention relates to a liquid crystal display of a micro display device driven by a liquid crystal through an arbitrary electric field and a manufacturing method thereof.

BACKGROUND ART

In general, a display device is a device that displays images on a display panel using electrical and optical characteristics. The display device includes a liquid crystal display (LCD), an organic light emitting diode (OLED) display, etc.

The LCD is a device that displays a desired image by applying an electric field to a liquid crystal material having an anisotropic dielectric constant injected between two substrates and controlling the intensity of the electric field and the amount of light transmitted through the substrate.

Liquid crystal molecules each have a thin and elongated structure, and the dielectric constants and light transmission properties of the liquid crystal molecules differ depending on a direction of the liquid crystal molecules. The liquid crystal display is driven by controlling an arrangement direction of the liquid crystal molecules by applying an electric field to the liquid crystal molecules using properties of the liquid crystal molecules.

That is, when an electric field is applied to the liquid crystal molecules to change the arrangement of the liquid crystal molecules, a light transmission state changes in the arrangement direction due to the light transmission properties of the liquid crystal molecules, thereby displaying an image.

For the liquid crystal display, various technologies are being developed to secure a wide viewing angle.

A method of widening a viewing angle includes: a multidomain formation method that secures the viewing angle by dividing one liquid crystal pixel into several areas and arranging the liquid crystal molecules differently in each area; a phase compensation method to reduce the change in phase difference for changes in viewing angle using a retardation film; an in-plane switching (IPS) method that secures the viewing angle by applying a lateral electric field to rotate the director of liquid crystal molecules on the plane of the substrate; and a vertical alignment (VA) method using a vertical alignment film to vertically align liquid crystal molecules and negative liquid crystal with dielectric anisotropy.

FIG. 1A is a cross-sectional view of a liquid crystal driving voltage off state of the IPS method of a conventional micro display device.

FIG. 1B is a cross-sectional view of a liquid crystal driving voltage on state (b) of the IPS method of a conventional micro display device.

The IPS type liquid crystal display includes an input polarizer 10, a TFT electrode layer 20, a liquid crystal layer 30, an orientation layer 40, a glass substrate 50, and an analysis layer 60. The liquid crystal layer 30 includes a plurality of liquid crystal molecules.

Referring to FIG. 1A and FIG. 1B, when the power is turned off (V off), a plurality of liquid crystal molecules are aligned in a direction matching or perpendicular to an input polarizer.

That is, since a twist angle of each of the plurality of liquid crystal molecules is 0 degrees or 90 degrees, modulation of a polarization phase does not occur.

On the other hand, when an electric field is applied to the electrode (V on), a voltage difference occurs between two electrodes existing on the horizontal plane. Here, a horizontal electric field is generated, which causes a plurality of liquid crystal molecules to align in a direction that matches the horizontal electric field.

This aligned direction is generally aligned with the input polarizer 10 at 45 degrees or an appropriate angle (between 0 degrees and 90 degrees) required for phase lag FIG. 2 is a cross-sectional view of a liquid crystal drive in a vertical arrangement method of a conventional LCOS micro display device. A conventional LCOS micro display device includes a driving substrate 15, a mirror layer 25, a lower alignment layer 35, an upper alignment layer 36, a liquid crystal layer 45, an ITO layer 55, and a cover layer 65. Here, the liquid crystal layer 45 includes a plurality of liquid crystal molecules.

The LCOS micro display uses a silicon substrate as a driving substrate to arrange electrodes that drive liquid crystal on top of the driving substrate.

A cover layer is spaced a predetermined distance from the driving substrate, and an ITO layer 55, which is a reference electrode, is disposed on a bottom surface of the cover layer.

Also, since the LCOS micro display generally uses a reflective liquid crystal driving method, the electrodes of the driving substrate serve as a reflective layer 410 that applies voltage and reflects light at the same time.

As illustrated in FIG. 2, the liquid crystal is changed in state by applying a voltage between the mirror layer 25 and the ITO layer 55 to operate in a vertical aligned nematic (VAN) method or a twisted nematic (TN) method depending on the conditions when voltage is applied and when voltage is not applied.

Referring to FIG. 2, the display device uses VAN liquid crystals in which liquid crystals are aligned in a vertical direction of the electric field.

A conventional technology operates in a method of arranging a mirror layer 25 electrode or electrodes between liquid crystal cells as an electrode for driving the liquid crystal layer 45 and setting a reference electrode at the top.

In this embodiment, an example of a micro display is given. However, even in the typical display, the display device is realized by arranging electrodes at the top and bottom of the liquid crystal layer 45 and using characteristics in which arrangement of a plurality of liquid crystal molecules changes in the horizontal direction when an electric field is applied to the liquid crystal layer 45 in the vertical direction.

In FIG. 2, the mirror layer 25 at the bottom is an electrode that determines a voltage of the pixel, and the ITO layer 55 at the top is an electrode that generates a reference voltage.

The liquid crystal receives a rotational force to rotate in the horizontal direction by intensity of the voltages of the mirror layer 25 at the bottom and the ITO layer 55 at the top.

The alignment layer in contact with each of the mirror layer 25 and the ITO layer 55 is a layer that provides a rotational force to determine the direction of a plurality of liquid crystal molecules in a state in which an electric field is not applied to the liquid crystal layer 45. The plurality of liquid crystal molecules receive a force to be arranged in the vertical direction by the alignment layer.

In the VAN method, a rotation direction of the plurality of liquid crystal molecules is determined by the strength of the electric field applied vertically and the restoring force caused by the alignment layer. The method operates by controlling polarization characteristics of the incident light.

The VAN may be applied to various devices other than display devices, such as phase modulation to create holograms and optical switches.

Meanwhile, in the conventional liquid crystal driving method, a direction of the electric field for driving the liquid crystal is determined. Therefore, in an off state, no electric field is applied and the direction of the liquid crystal is determined by anorientation angle of the alignment layer formed on the surface of the liquid crystal cell. In an on state, a method of sorting according to the applied voltage is used.

For this reason, existing liquid crystal cells need to have an alignment layer for reference alignment or a corresponding alignment pattern.

Also, in the off state, since there is no electric field applied to the liquid crystal cell, the liquid crystal only has response characteristics due to the restoring force of the alignment layer. For this reason, the response characteristics are determined only by the characteristics of the alignment layer and the liquid crystal itself.

As this has a constant value regardless of the electrical driving of the liquid crystal, there is a limit in improving a response speed of the liquid crystal by electrical driving.

Also, the vertical electric field method requires an ITO layer on the top glass, which has not only a complicate process but also a disadvantage of causing loss of self-light.

Also, in structures requiring a conventional alignment layer, there was a problem in that the surface became rough due to surface adsorption by impurities.

PRIOR ART DOCUMENT

Patent Document (Patent Document 1) JP 6186112 B2

DISCLOSURE

Technical Problem

The present invention provides a liquid crystal display device for a micro display device, which is capable of removing a process and a structure required for an alignment layer or alignment using a liquid crystal driving method using an arbitrary electric field. The purpose of the present invention is to provide a liquid crystal display device for a micro display device that may eliminate the upper reference electrode used in the vertical electric field driving method.

Also, another object of the present invention is to provide a method of manufacturing a liquid crystal display device that may achieve the above object.

Technical Solution

An embodiment of the present invention provides a liquid crystal display of a micro display device, the liquid crystal display including a pixel driving circuit output electrode body in which a pixel circuit output voltage unit, a first columnar electrode, and a first layer electrode are sequentially stacked; a first intermetallic dielectric covering a side of the pixel driving circuit output electrode body; a third intermetallic dielectric stacked on a top surface of the first intermetallic dielectric and a top surface of the pattern; a second columnar electrode passing through the third intermetallic dielectric and connected to a top surface of the first layer electrode; and a protective film stacked on a top surface of the second columnar electrode and a top surface of the third intermetallic dielectric.

In an embodiment of the present invention, a liquid crystal display of a micro display device includes: a pixel driving circuit output electrode body in which a pixel circuit output voltage unit, a first columnar electrode, and a first layer electrode are sequentially stacked; a first intermetallic dielectric covering a side of the pixel driving circuit output electrode body; a second columnar electrode passing through the third intermetallic dielectric and connected to a top surface of the first layer electrode; the third intermetallic dielectric covering a side surface of the second columnar electrode and a top surface of the pattern; and a protective film covering a top surface of the second columnar electrode.

In an embodiment of the present invention, a liquid crystal display of a micro display device includes: a pixel driving circuit output electrode body in which a pixel circuit output voltage unit, a first columnar electrode, and a first layer electrode are sequentially stacked; a first intermetallic dielectric covering a side of the pixel driving circuit output electrode body; a second intermetallic dielectric stacked on a top surface of the first layer electrode and a top surface of the first intermetallic dielectric; a pattern formed on at least a portion of a top surface of the second intermetallic dielectric; a third intermetallic dielectric stacked on a top surface of the second intermetallic dielectric and a top surface of the pattern; a second columnar electrode passing through the second and third intermetallic dielectrics and connected to a top surface of the first layer electrode; and a protective film stacked on a top surface of the second columnar electrode and a top surface of the third intermetallic dielectric.

In an embodiment of the present invention, a liquid crystal display of a micro display device according to the present invention for achieving the above object is characterized by including a pixel driving circuit output electrode body in which a pixel circuit output voltage unit, a first columnar electrode, and a first layer electrode are sequentially stacked; a first intermetallic dielectric covering a side of the pixel driving circuit output electrode body; a second intermetallic dielectric stacked on a top surface of the pixel driving circuit output electrode body and a top surface of the first intermetallic dielectric; a pattern formed on at least a portion of a top surface of the second intermetallic dielectric; a second columnar electrode connected to a top surface of the first layer electrode through the second intermetallic dielectric and the third intermetallic dielectric; the third intermetallic dielectric covering a side surface of the second columnar electrode and a top surface of the pattern; and a protective film covering a top surface of the second columnar electrode.

In an embodiment, the protective film, as a dielectric, may prevent an oxide film from being formed on the second columnar electrode.

In an embodiment, the first and second columnar electrodes may be made of a metal material.

In an embodiment of the present invention, a method of manufacturing a liquid crystal display of a micro display device includes: (a) forming a pixel driving circuit output electrode body by sequentially stacking a pixel circuit output voltage unit, a first columnar electrode, and a first layer electrode; (b) depositing a first intermetallic dielectric to cover a side of the pixel driving circuit output electrode body; (c) depositing a second intermetallic dielectric on a top surface of the first layer electrode and a top surface of the first intermetallic dielectric; (d) forming a pattern on at least a portion of the top surface of the first intermetallic dielectric while exposing at least a portion of the top surface of the first layer electrode; (e) depositing a third intermetallic dielectric on a top surface of the second intermetallic dielectric exposed by the pattern and on a top surface of the pattern; (f) forming a second via that penetrates the third intermetallic dielectric and the top surface of the second intermetallic dielectric exposed by the pattern and is connected to the top surface of the first layer electrode; (g) filling the inside of the formed second via with a metal material; and (h) depositing a protective film on a top surface of the filled metal material and the second intermetallic dielectric.

In an embodiment, step (a) may include: depositing a first intermetallic dielectric on the pixel circuit output voltage unit, forming a first via having one side connected to the top surface of the pixel circuit output voltage unit among the deposited first intermetallic dielectrics; and depositing the first layer electrode layer on the other side of the first via.

In an embodiment, the method may further include, after step (h), selectively etching the second intermetallic dielectric and the protective film to an extent that the top surface of the pattern and the metal material are not exposed.

In an embodiment, in step (h), the protective film that is a dielectric may prevent an oxide film from being formed on the metal material.

In an embodiment of the present invention, a computer-readable recording medium records a program for performing the method of manufacturing a liquid crystal display.

Advantageous Effects

According to the present invention, an electric field in any direction is possible, thereby increasing the response speed of the liquid crystal. Also, the ITO layer and alignment film become unnecessary, simplifying the process. In addition, it is possible to prevent degradative properties due to surface adsorption by impurities.

Also, the present invention uses pillar-shaped or point-shaped electrodes instead of flat electrodes to implement a random electric field. Therefore, the direction of the horizontal electric field is arbitrarily designated. Accordingly, the present invention prevents the problem of flat electrodes in which the desired electric field is weakened or not formed.

Also, the plurality of column-shaped electrodes are additionally disposed at the edge of the display area. Accordingly, the adhesion between the lower driving substrate and the upper glass is significantly improved.

DESCRIPTION OF DRAWINGS

FIG. 5A to FIG. 5I are views showing various examples of the voltage arrangement and shape of a planar electrode, according to an embodiment of the present invention.

MODE FOR INVENTION

Figure 1A:
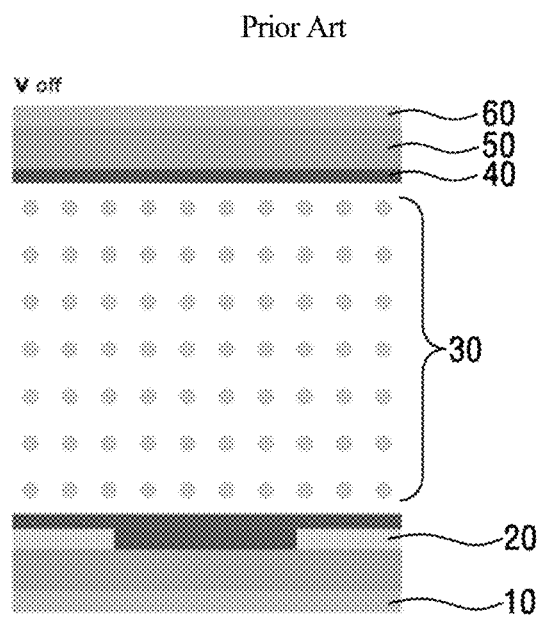
FIG. 1A is a cross-sectional view of a liquid crystal driving voltage off state of a horizontal electrode switching (IPS) method of a conventional micro display device.
Figure 1B:
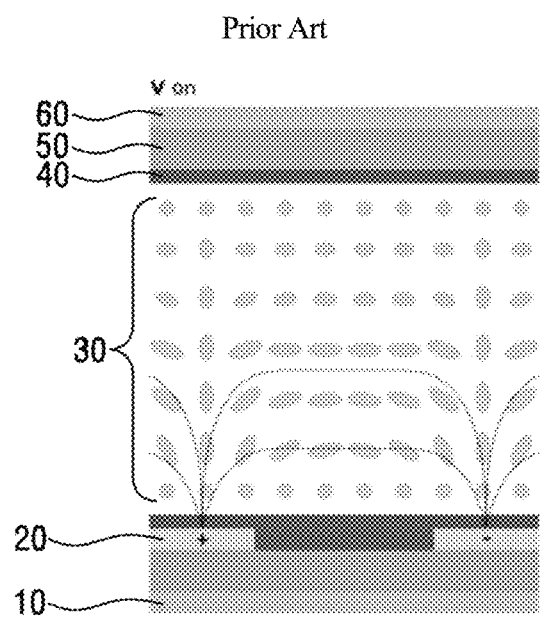
FIG. 1B is a cross-sectional view of a liquid crystal driving voltage on state (b) of a horizontal electrode switching (IPS) method of a conventional micro display device.
Figure 2:
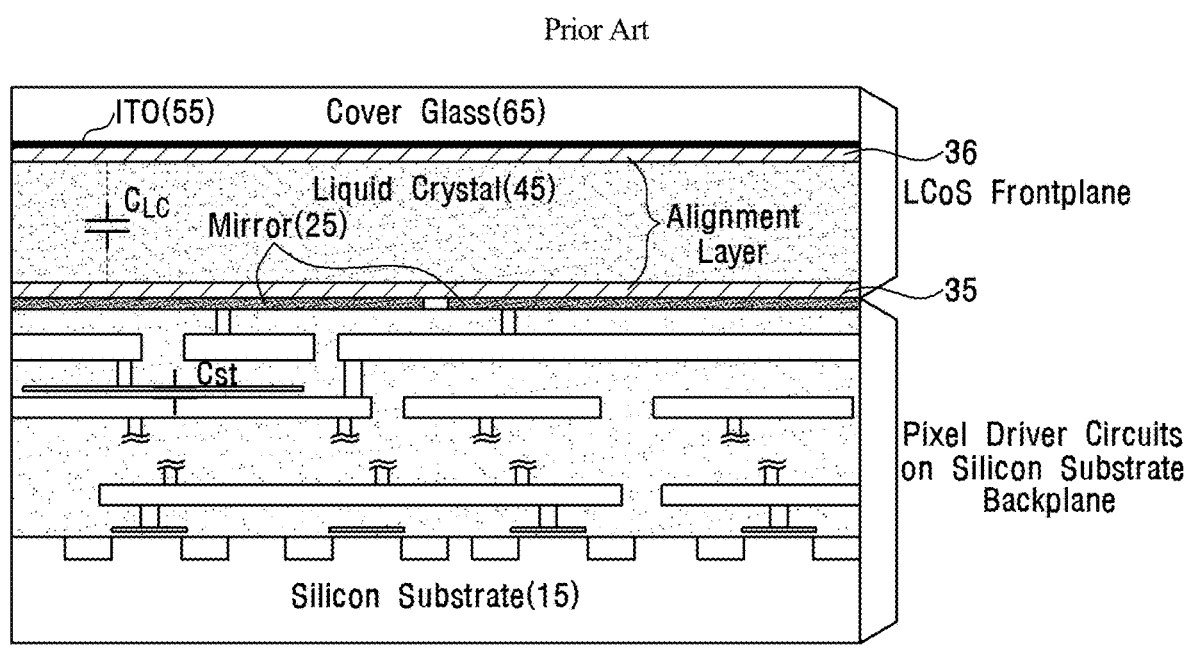
FIG. 2 is a cross-sectional view of a liquid crystal drive in a vertical arrangement method of a conventional LCOS micro display device.

Hereinafter, embodiments disclosed in the present specification will be described in detail with reference to the attached drawings. However, identical or similar components will be assigned the same reference numbers regardless of reference numerals, and duplicate descriptions thereof will be omitted. The suffix "part" for the components used in the following description is given or used interchangeably only for the ease of preparing the specification, and does not have a distinct meaning or role in itself.

Also, in describing the embodiments disclosed in this specification, if it is determined that detailed descriptions of related known technologies may obscure the gist of the embodiments disclosed in this specification, the detailed descriptions will be omitted. In addition, the attached drawings are only intended to facilitate understanding of the embodiments disclosed in this specification, and the technical idea disclosed in this specification is not limited by the attached drawings. This specification should be understood to include all changes, equivalents, and substitutes included in the spirit and technical scope of the present invention.

Hereinafter, embodiments according to the present invention will be described in detail with reference to the attached drawings.

Figure 3A:
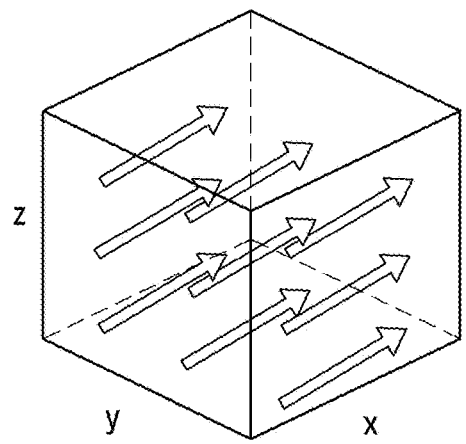
FIG. 3A is a view for explaining a state in which an electric field of a liquid crystal is driven such that a direction of an electric field of the liquid crystal is parallel to an x-axis.
Figure 3B:
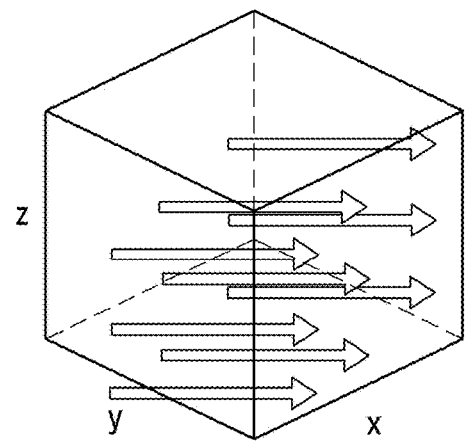
FIG. 3B is a view for explaining a state in which an electric field of a liquid crystal is driven such that the electric field direction of the liquid crystal is inclined by 45 degrees with an x-axis.
Figure 3C:
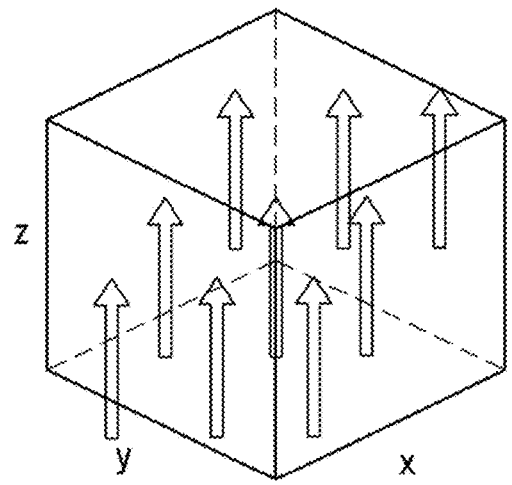
FIG. 3C is a view for explaining a state in which an electric field is driven such that an electric field direction of a liquid crystal is aligned with a z-axis.
Figure 3D:
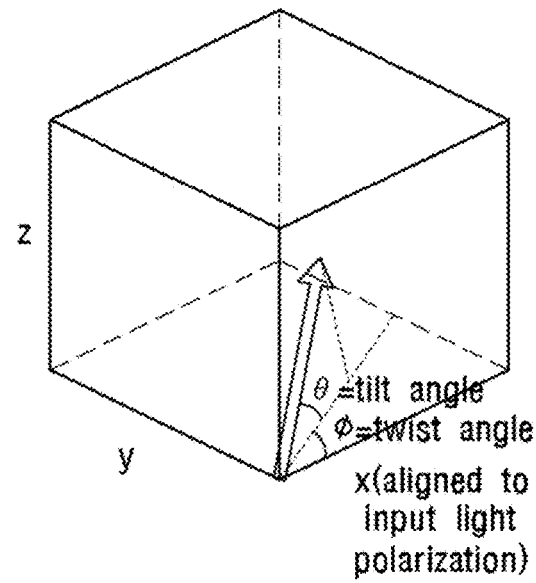
FIG. 3D is a view for explaining a state in which the alignment angle of liquid crystals aligned in an electric field is expressed as a twist angle ($\theta$) and a tilt angle ($\emptyset$).

FIG. 3A is a view for explaining a state in which an electric field of a liquid crystal is driven such that a direction of an electric field of the liquid crystal is parallel to an x-axis. FIG. 3B is a view for explaining a state in which an electric field of a liquid crystal is driven such that the electric field direction of the liquid crystal is inclined by 45 degrees with an x-axis. FIG. 3C is a view for explaining a state in which an electric field is driven such that an electric field direction of a liquid crystal is aligned with a z-axis. FIG. 3D is a view explaining a state in which the alignment angle of liquid crystals aligned in an electric field is expressed as a twist angle (θ) and a tilt angle (Ø).

As illustrated in FIG. 3A, the X-axis direction is a polarization direction of the input light, and the alignment of the liquid crystal matches the polarization of the input light.

That is, according to the well-known liquid crystal polarization phase modulation theory, the polarization phase of the output light is output in the same state as the input phase.

Also, polarization phase modulation does not occur even when the electric field direction of the liquid crystal is aligned with the y-axis.

As illustrated in FIG. 3B, when the tilt angle is 90 degrees, as the polarization direction of the input light is tilted by 45 degrees with respect to the liquid crystal, the phase delay between the polarization component parallel to the liquid crystal and the polarization component perpendicular to the liquid crystal is maximized, resulting in polarization phase modulation.

As illustrated in FIG. 3C, as the alignment direction of the liquid crystal becomes the z-axis, polarization modulation does not occur in this case.

As illustrated in FIG. 3D, when the polarizer is aligned on the x-axis for input light and the y-axis for output light, the intensity of output light, that is, transmittance may be expressed by Equation 1 below.

$$T = \frac{1}{2}\sin^2(2\emptyset)\sin^2\left(\frac{\pi([n_\theta(\theta) - n_0])d}{\lambda}\right)$$ [Mathematical equation 1]

Here, Ø is the tilt angle, θ is the twist angle, λ is the wavelength of light, Δn0 is the difference in refractive index anisotropy of the liquid crystal, and d is the gap between cells.

For example, when the direction of the electric field is horizontal to the x-axis, the tilt angle (Ø) of the liquid crystal aligned with the electric field becomes 0° and the transmittance becomes '0', so the output light becomes black.

On the other hand, when the electric field direction is diagonal to the x-axis, the tilt angle (Ø) of the liquid crystal aligned with the electric field becomes 45° and the transmittance reaches its maximum value, so the output light becomes white.

In order to implement the liquid crystal driving method using a random electric field of the present invention, In the case of existing flat micro display devices, arbitrary electric field directions may be implemented in the horizontal direction by arranging voltages in various forms on each driving electrode.

That is, this is a case in which electrodes are arranged in a square (or rectangular) shape on the xy plane, and the sides of each electrode are aligned with the x-axis or y-axis. A collection of electrodes with the same x-axis value is defined as a row, and a collection of electrodes with the same y-axis value is defined as a row.

Figure 4A:
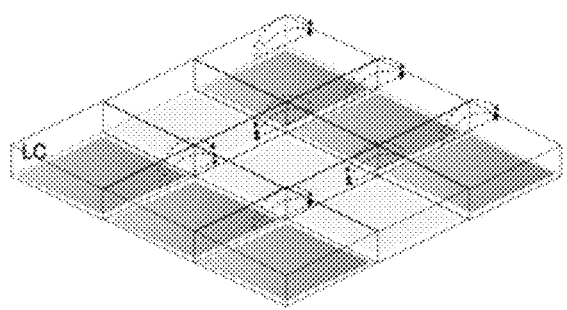
FIG. 4A is a view showing an embodiment in which electrode voltages are arranged so that the voltage changes along the x-axis direction.
Figure 4B:
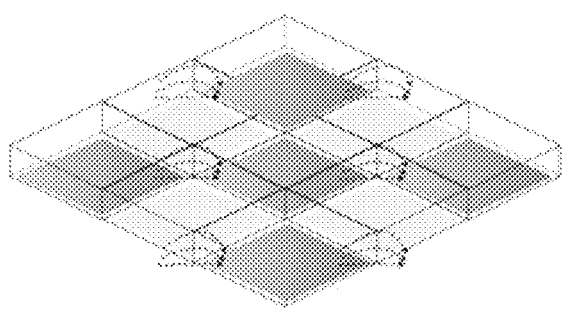
FIG. 4B is a view showing an example in which electrodes are arranged at a 45 degree angle along the x-axis so that the direction of the electric field is set to be 45 degrees from the x-axis on average.

FIG. 4A is a view showing an embodiment in which electrode voltages are arranged so that the voltage changes along the x-axis direction. FIG. 4B is a view showing an example in which electrodes are arranged at a 45 degree angle along the x-axis so that the direction of the electric field is set to be 45 degrees from the x-axis on average.

As illustrated in FIG. 4A, the same voltage is applied to the electrodes in the same row, and a voltage difference is generated between each row to control the direction of the electric field to occur in the x-axis direction.

In this case, the direction of the electric field occurs in the x-axis direction, and the liquid crystals are aligned according to the direction of the electric field.

Also, polarization phase modulation of incident light does not occur.

When an input/output orthogonal polarizer is used, the tilt angle becomes 0°, and the intensity of the output light becomes '0' according to Equation 1 above.

On the other hand, As illustrated in FIG. 4B, when the voltage of the electrodes in the diagonal direction is made the same, the average value of the electric field is in the diagonal direction. Therefore, the twist angle between the incident light and the liquid crystal has a value of 90 degrees in the diagonal direction of the electrode.

In this random direction electric field driving method, it is not important whether or not the reference electrode is disposed on the glass cover of the top plate.

Figures 5A, 5B, 5C, 5D, 5E, 5F, 5G, 5H, 5I:
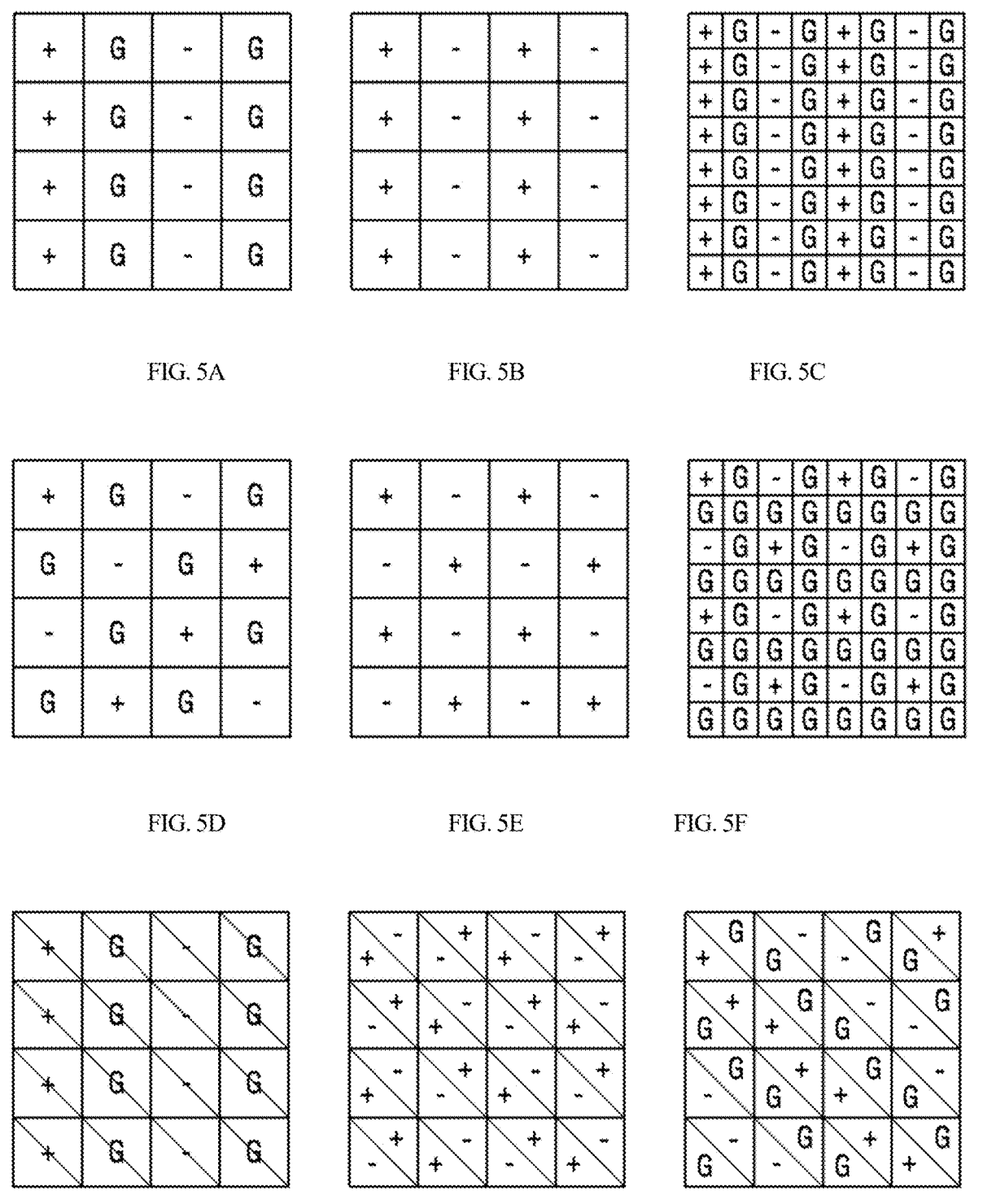

FIG. 5A to FIG. 5I are views showing various examples of the voltage arrangement and shape of a planar electrode, according to an embodiment of the present invention. FIG. 5A is a case in which an intermediate voltage is added between a high voltage and a low voltage so that the electric field is reversed in two pixel units, and FIG. 5B is an example of FIG. 4A.

Also, FIG. 5C is a case in which each pixel is divided into four electrodes and the number of border electrodes is increased to maximize the effect. In this way, one electrode may be divided into several electrodes instead of four.

Also, FIG. 5D, FIG. 5E, and FIG. 5F have the same electrode arrangement as FIG. 5A, FIG. 5B, and FIG. 5C, but the voltage arrangement of the electrodes is arranged diagonally.

Also, (g), (h), and (i) are cases where each pixel is divided in the diagonal direction to more easily and uniformly generate an electric field in the diagonal direction.

Among these, (c) and (d) are structures in which one pixel is divided into a plurality of electrodes, and the twist angle of the liquid crystal is adjusted by combining several liquid crystal driving electrodes within the pixel.

Also, (g), (h), and (i) divide square or rectangular pixels into two or more electrodes with diagonal surfaces to facilitate generation of 45 degrees or arbitrary electric field direction. Accordingly, (g), (h), and (i) are pixel electrode structures that generate an electric field in the diagonal direction.

Figure 6A:
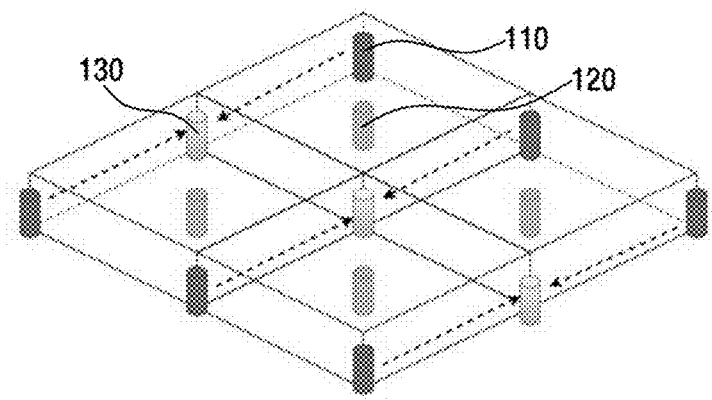
FIG. 6A and FIG. 6B are schematic perspective views showing an example of arbitrarily designating the direction of a horizontal electric field by using column-shaped or point-shaped electrodes instead of flat electrodes to implement a random electric field, according to another embodiment of the present invention.
Figure 6B:
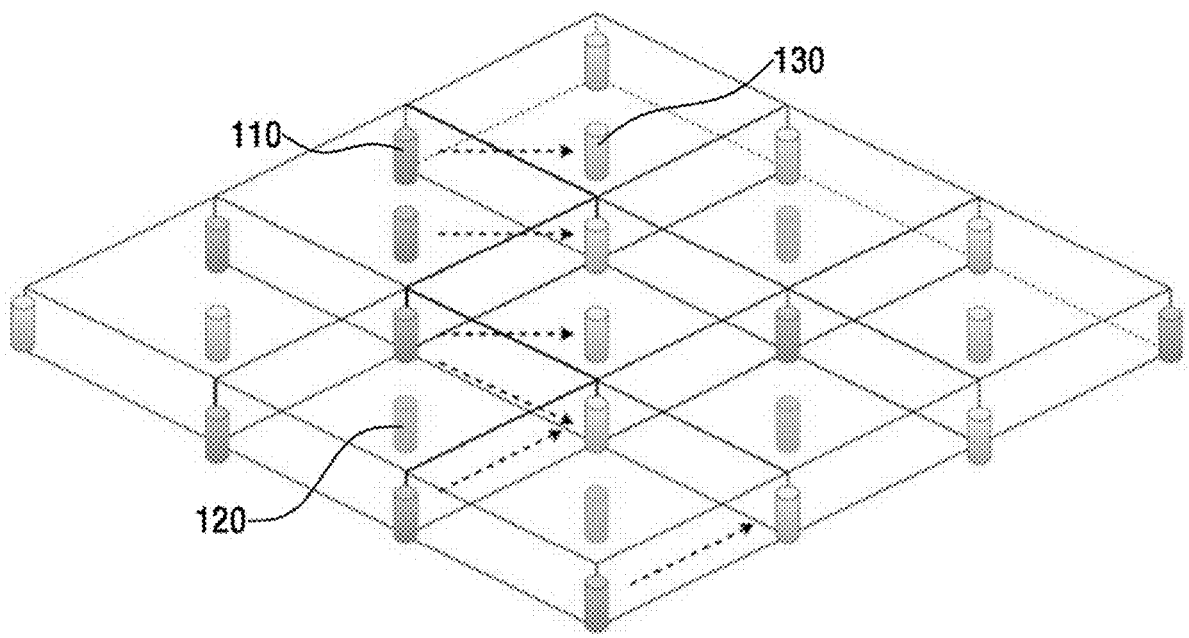

FIG. 6A and FIG. 6B are schematic perspective views showing an example of arbitrarily designating the direction of a horizontal electric field by using column-shaped or point-shaped electrodes instead of flat electrodes to implement a random electric field, according to another embodiment of the present invention. FIG. 6A and FIG. 6B comprise a plurality of first electrodes 110, a plurality of second electrodes 120, and a plurality of third electrodes 130.

Generally, when using a flat electrode, a horizontal electric field occurs only at the boundary between electrodes.

Because of this, there is a disadvantage in that the formation of the desired electric field is weak or almost not formed inside the electrode.

To overcome this problem, as illustrated in FIG. 4A and FIG. 4B, when the flat electrode is divided as much as possible within the pixel, there is an advantage in that the intensity and area of the horizontal electric field may be expanded.

However, there are disadvantages in that driving complexity increases due to an increase in the number of electrodes, and reflectivity deteriorates as electrode occupancy decreases when driving each electrode.

Accordingly, in this embodiment, as illustrated in FIG. 6A, it is arranged so that the highest voltage is applied to the first electrode (red, 110). It is arranged so that a medium voltage is applied to the second electrode (yellow, 120). It is arranged so that the lowest voltage is applied to the third electrode (gray, 130).

Accordingly, an electric field is generated in a direction parallel to the x-axis by the voltage value of each pillar.

Also, in this embodiment, as illustrated in FIG. 6B, the first electrode (red, 110), the second electrode (yellow, 120), and the third electrode (gray, 130) may be randomly arranged.

Accordingly, for each pixel, an electric field is generated in a direction parallel to the x-axis, parallel to the y-axis, and in a direction inclined at 45 degrees from the x-axis, depending on the voltage value of each pillar.

Figure 7A:
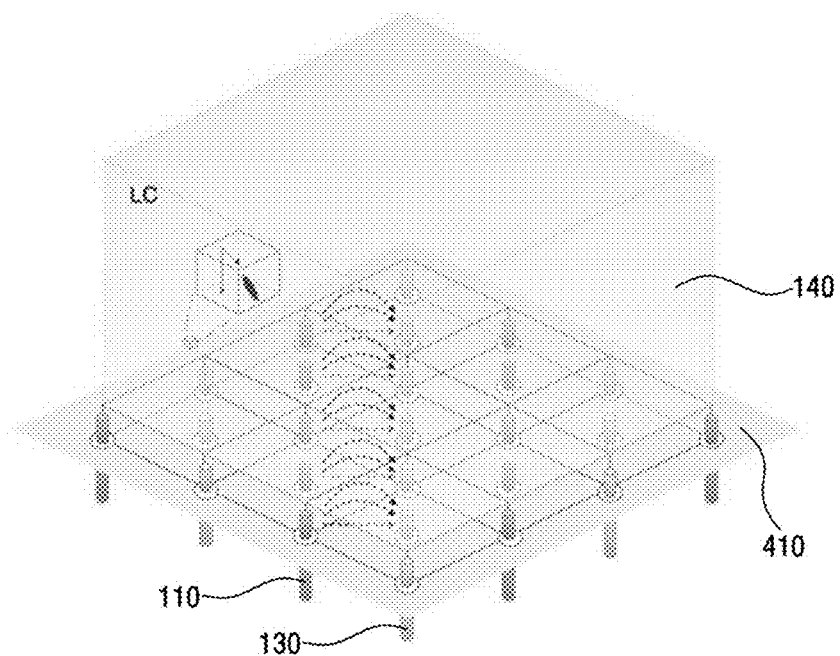
FIG. 7A and FIG. 7B are schematic perspective views of an embodiment applying a driving method for driving an electric field in a random direction using a point-shaped electrode on a plane, according to another embodiment of the present invention.
Figure 7B:
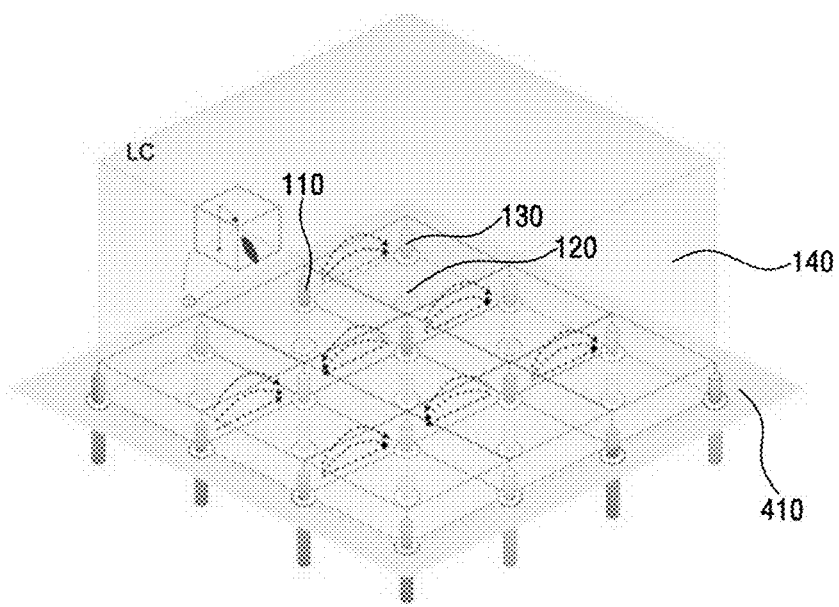

FIG. 7A and FIG. 7B are schematic perspective views of an embodiment applying a driving method for driving an electric field in a random direction using a point-shaped electrode on a plane, according to another embodiment of the present invention, including a liquid crystal cell 140 and a reflective layer 410.

This is an example of a liquid crystal cell 140 using columnar electrodes, and the gray square represents the reflective layer 410 of a reflective LCD. In addition, holes are drilled in the reflective layer 410 at regular intervals. A method of arranging a pillar connected to a lower driving circuit on the reflective layer 410 is used.

The example in FIG. 7A is an example in which a pillar-shaped electrode, which is a driving electrode, is disposed below the liquid crystal and covered with a dielectric.

In this case, the electric field generated from each electrode is disposed below the liquid crystal cell 140. Since the horizontal electric field radiates from each point, a disadvantage may occur in which the strength of the electric field is weakened in the middle part of the liquid crystal cell 140.

In order to compensate for this shortcoming the example in FIG. 7B makes the columnar electrodes to be placed in the middle of the liquid crystal cell 140.

In this way, when the height of the pillar is the same as the end of the liquid crystal cell, the strength of the horizontal electric field may be relatively strong and the direction may be made constant.

Figure 8:
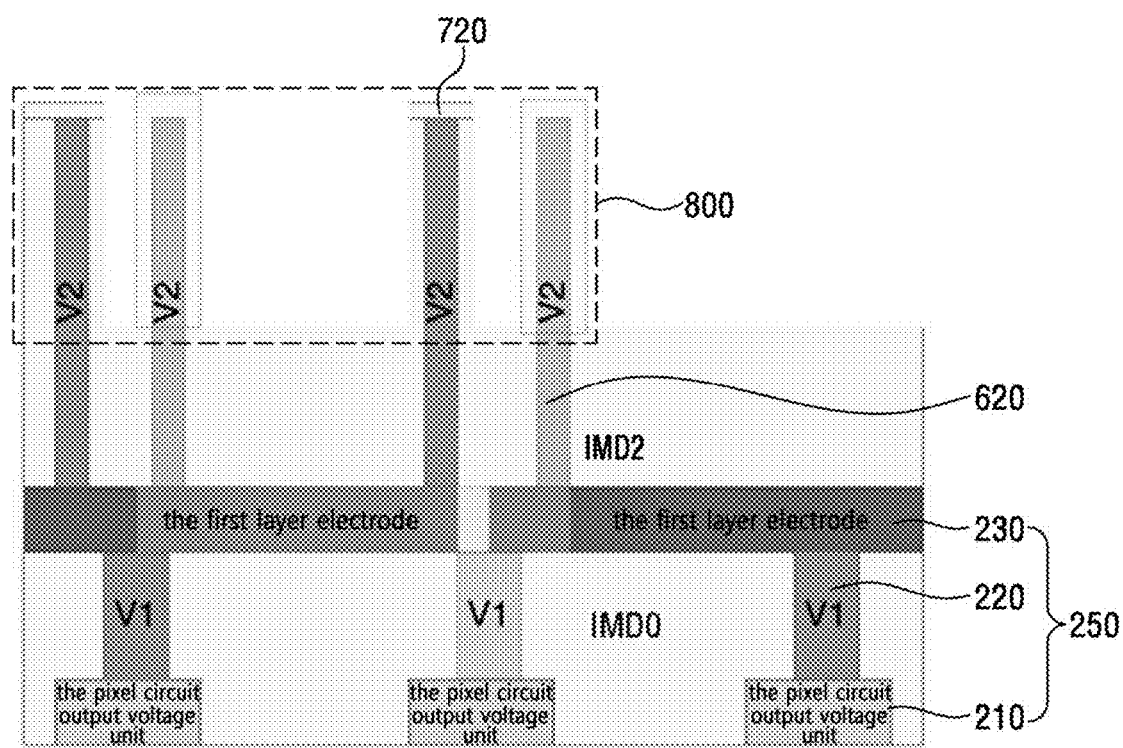
FIG. 8 is a cross-sectional view of the driving substrate provided below the liquid crystal cell shown in FIG. 7A and FIG. 7B.

FIG. 8 is a cross-sectional view of a liquid crystal display manufactured according to the first embodiment of the present invention, including a pixel driving circuit output electrode body 250, a third intermetallic dielectric 510, and a plurality of second columnar electrodes 800.

As illustrated in FIG. 8, the pixel driving circuit output electrode body 250 is formed by sequentially stacking the pixel circuit output voltage unit 210, the first columnar electrode 220, and the first layer electrode 230.

Figure 9:
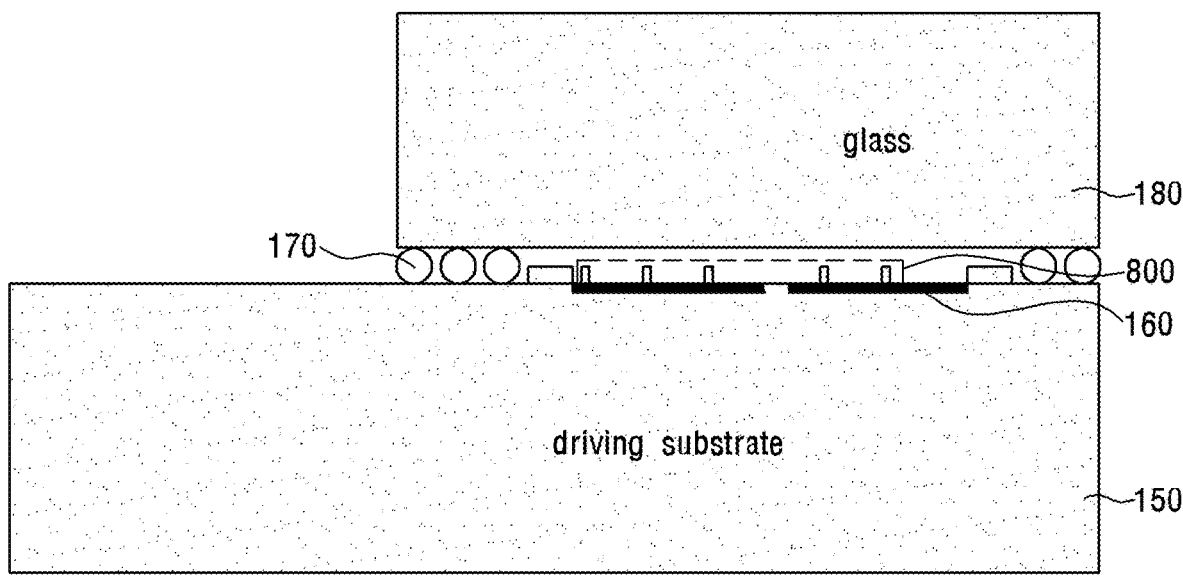
FIG. 9 is a schematic cross-sectional view of a micro display device using the driving substrate and columnar electrodes formed in FIG. 8.

FIG. 9 is a schematic cross-sectional view of a micro display device using the driving substrate and columnar electrodes formed in FIG. 8, including a driving substrate 150, a pixel area 160, a plurality of ceramic balls 170, glass 180, and a plurality of columnar electrodes 800.

As illustrated in FIG. 9, a liquid crystal cell is disposed between the lower driving substrate 150 and the upper glass 180, and a columnar electrode 800 is disposed inside the liquid crystal cell.

In this way, by additionally placing a plurality of columnar electrodes 800 at the edge of the display area, the adhesion between the lower driving substrate 150 and the upper glass 180 is significantly improved.

FIG. 10A to FIG. 10E are process views showing a method of manufacturing a liquid crystal display of a micro display device according to the first embodiment of the present invention.

Figure 10A:
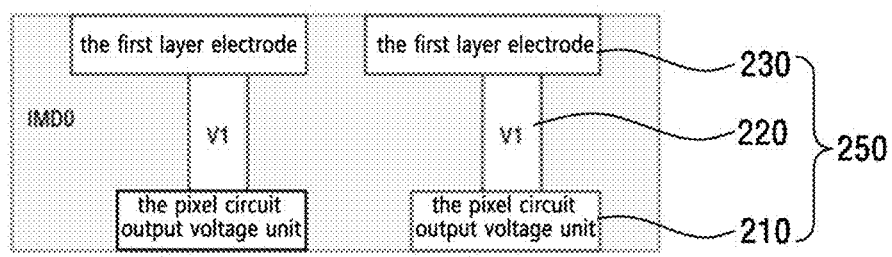
FIG. 10A to FIG. 10E are process views showing a method of manufacturing a liquid crystal display of a micro display device according to the first embodiment of the present invention.
Figure 10B:
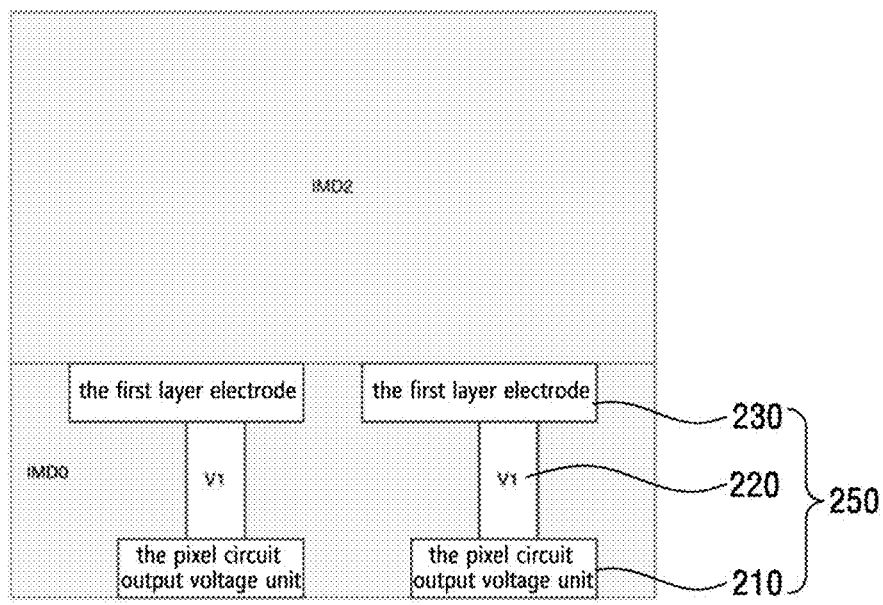
Figure 10C:
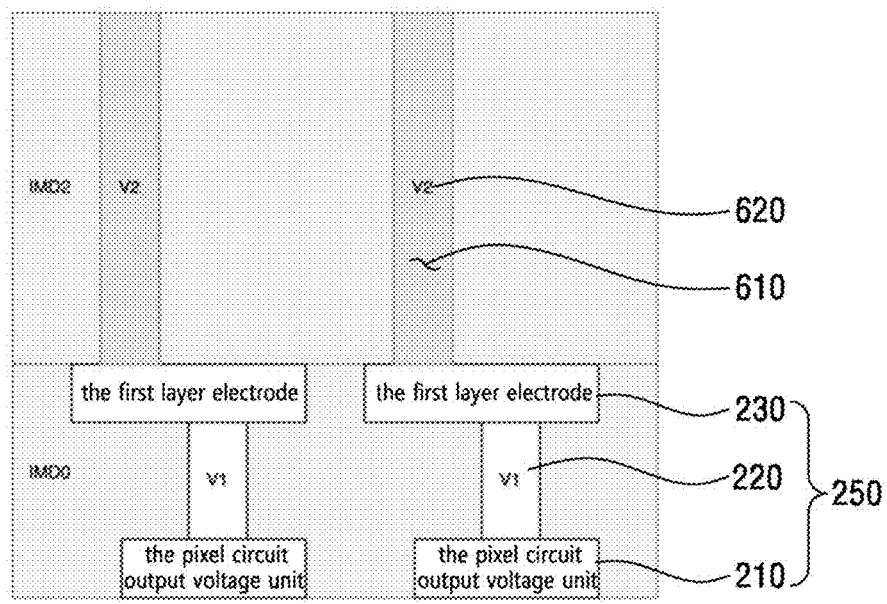
Figure 10D:
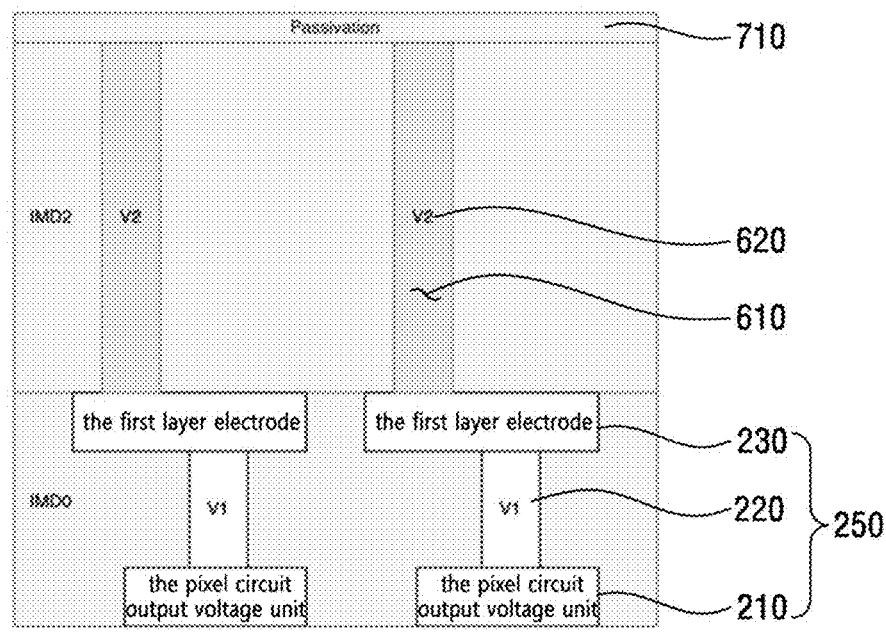
Figure 10E:
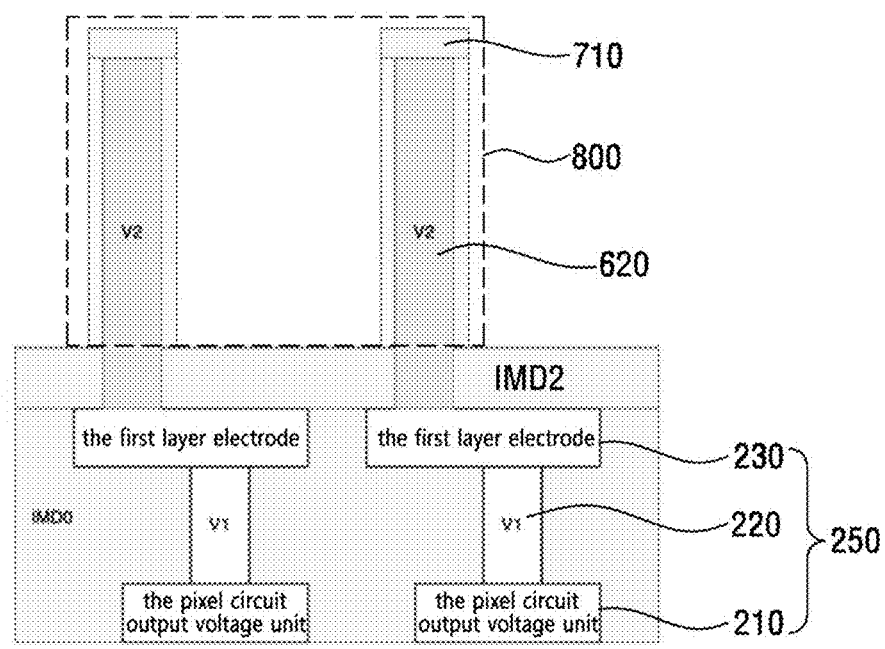
Figure 11:
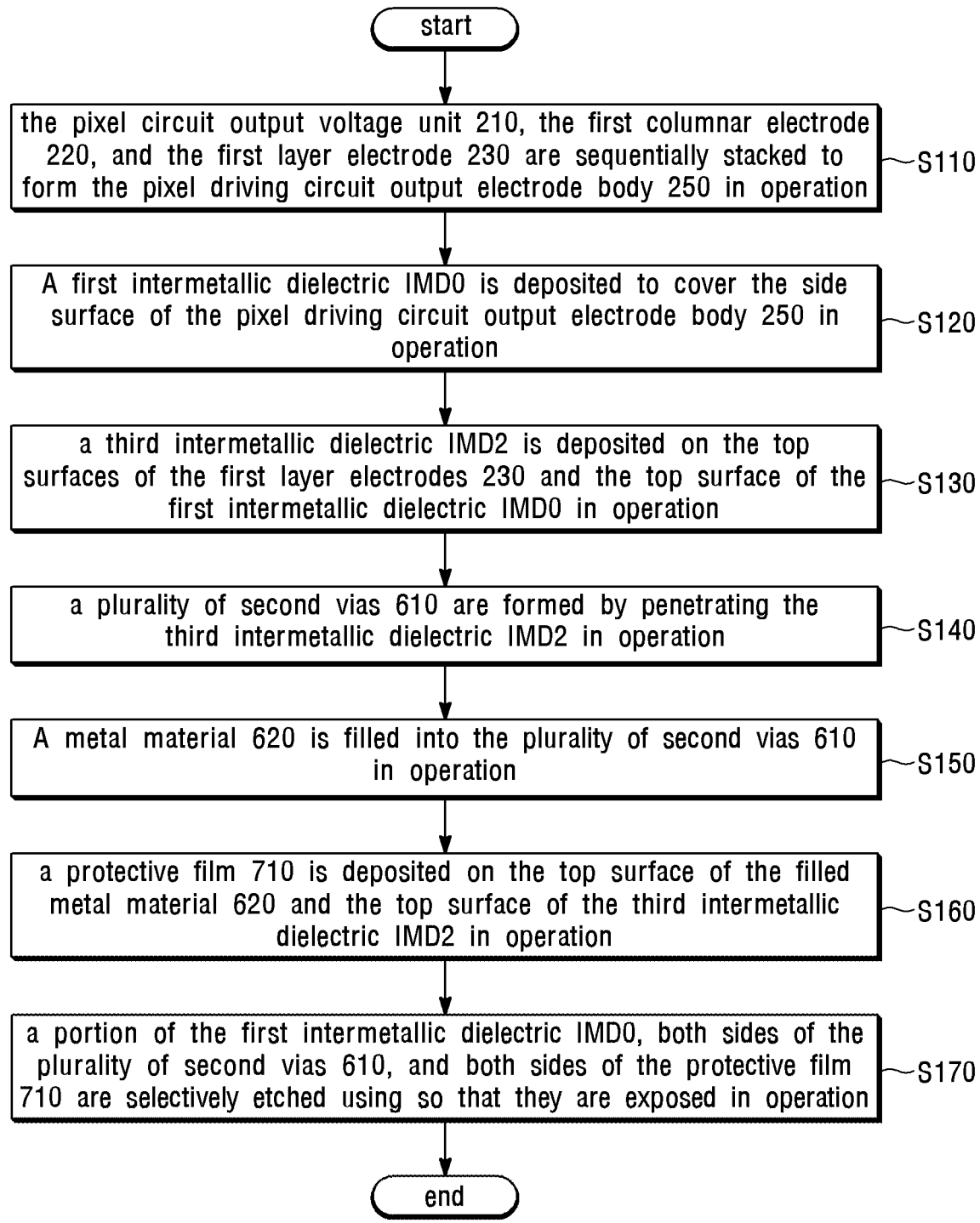
FIG. 11 is a flowchart of the manufacturing method according to the first embodiment of the present invention shown in FIG. 10(a) to FIG. 10(e).

FIG. 11 is a flowchart of the manufacturing method according to the first embodiment of the present invention shown in FIG. 10A to FIG. 10E.

First, as illustrated in FIG. 10A, the pixel circuit output voltage unit 210, the first columnar electrode 220, and the first layer electrode 230 are sequentially stacked to form the pixel driving circuit output electrode body 250 in operation S110.

Here, each of the plurality of pixel driving circuit output electrode bodies 250 comprises a pixel circuit output voltage unit 210, a first layer electrode 230, and a first via 220 connecting a pixel circuit output voltage unit 210 and a first layer electrode 230. A first intermetallic dielectric IMD0 is deposited to cover the side surface of the pixel driving circuit output electrode body 250 in operation S120.

As illustrated in FIG. 10B, a third intermetallic dielectric IMD2 is deposited on the top surfaces of the plurality of first layer electrodes 230 and the top surface of the first intermetallic dielectric IMD0 in operation S130.

As illustrated in FIG. 10C, a plurality of second vias 610 connected to the top surface of the plurality of first layer electrodes 230 are formed by penetrating the top surface of the third intermetallic dielectric IMD2 in operation S140.

A metal material 620 is filled into the plurality of second vias 610 in operation S150.

As illustrated in FIG. 10D, a protective film 710 is deposited on the top surface of the filled metal material 620 and the top surface of the third intermetallic dielectric IMD2 in operation S160.

Here, the protective film 710 is a dielectric. This is to prevent the formation of an oxide film on the metallic material 620 in the plurality of second vias.

As illustrated in FIG. 10E, a portion of the top surface of the first intermetallic dielectric IMD0, both sides of the plurality of second vias 610, and both sides of the protective film 710 are selectively etched using a photography process so that they are exposed in operation S170.

The etched space is to secure space for liquid crystal injection.

In this way, the liquid crystal display of the micro display device according to the first embodiment of the present invention, the plurality of first layer electrodes 230 simultaneously function as electric field driving electrodes and reflective layers.

Figure 12:
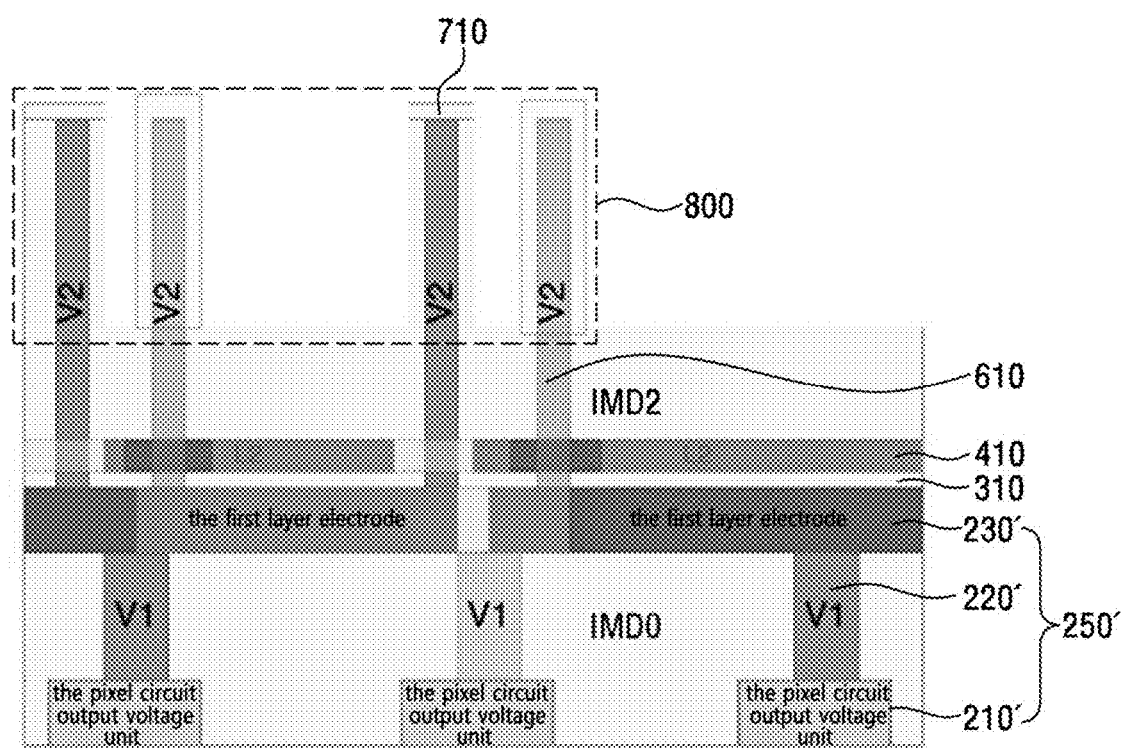
FIG. 12 is a cross-sectional view of the liquid crystal display of the micro display device according to the second embodiment of the present invention.

FIG. 12 is a cross-sectional view of the liquid crystal display of the micro display device according to the second embodiment of the present invention. FIG. 13A to FIG. 13G are process views showing a method of manufacturing a liquid crystal display of a micro display device according to a second embodiment of the present invention. FIG. 14 is a flowchart of the manufacturing method according to the second embodiment of the present invention shown in FIG. 13A to FIG. 13G.

Figure 13A:
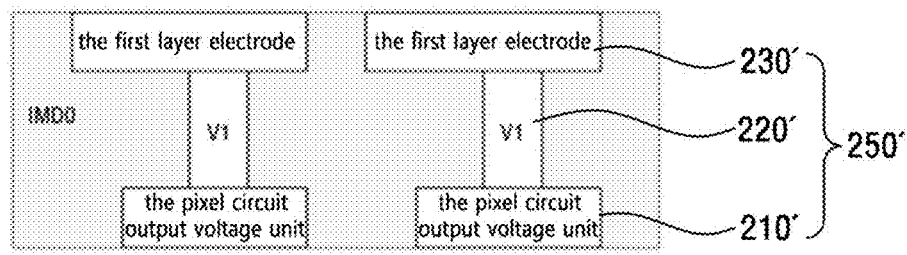
FIG. 13A to FIG. 13G are process views showing a method of manufacturing a liquid crystal display of a micro display device according to a second embodiment of the present invention.
Figure 14:
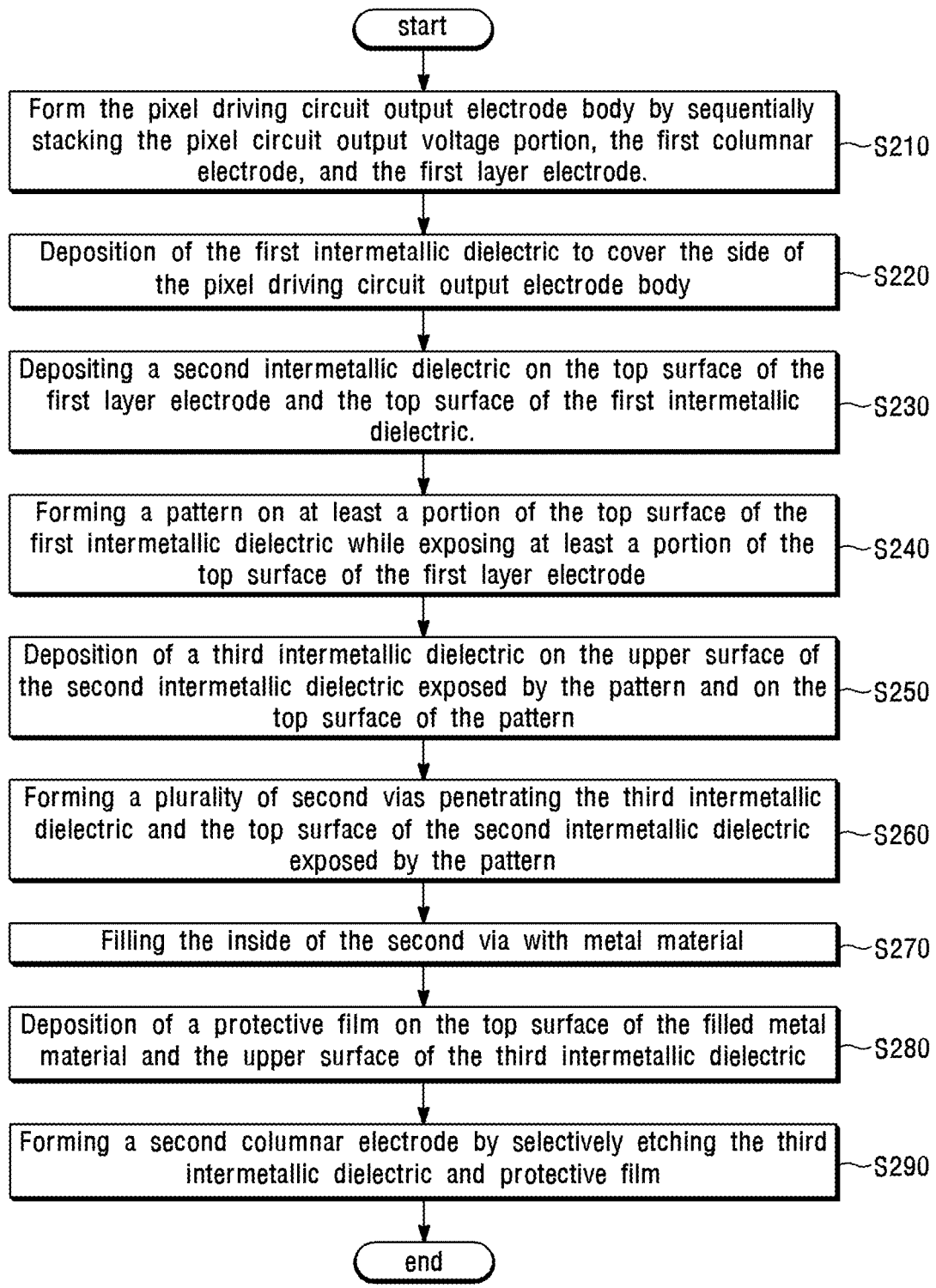
FIG. 14 is a flowchart of the manufacturing method according to the second embodiment of the present invention shown in FIG. 13A to FIG. 13G.

As illustrated in FIG. 13A, the first intermetallic dielectric IMD0 is deposited on the pixel circuit output voltage unit 210' in operation S220.

A plurality of first columnar electrodes 220' are formed on the top surfaces of the plurality of pixel circuit output voltage units 210' respectively through a via process.

A first layer electrode 230' is stacked on the first intermetallic dielectric IMD0 and the plurality of first columnar electrodes 220'.

Figure 13B:
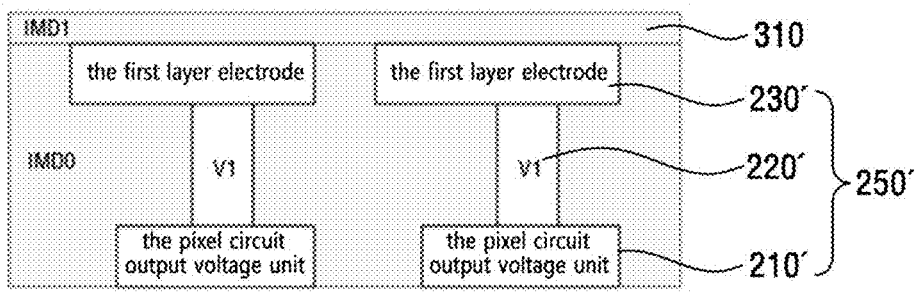

As illustrated in FIG. 13B, a second intermetallic dielectric IMD1, which is an insulating layer, is stacked on the top surface of the first layer electrode 230 and the top surface of the first intermetallic dielectric IMD0 in operation S230.

Figure 13C:
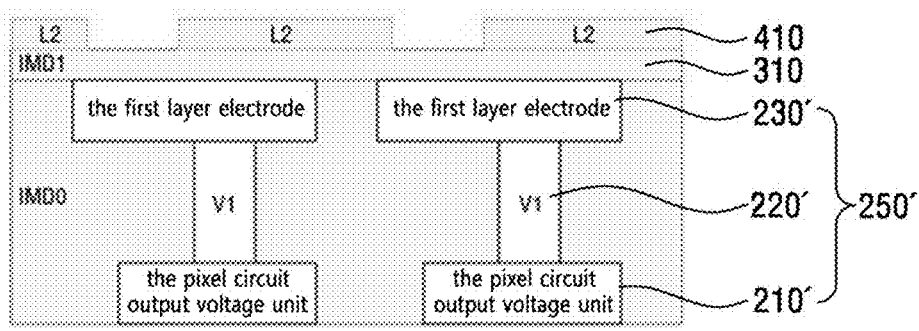

As illustrated in FIG. 13C, a pattern 410, which is a reflective layer, is formed on at least a portion of the top surface of the first intermetallic dielectric IMD0 while exposing at least a portion of the top surface of the first layer electrode 230' in operation S240.

Figure 13D:
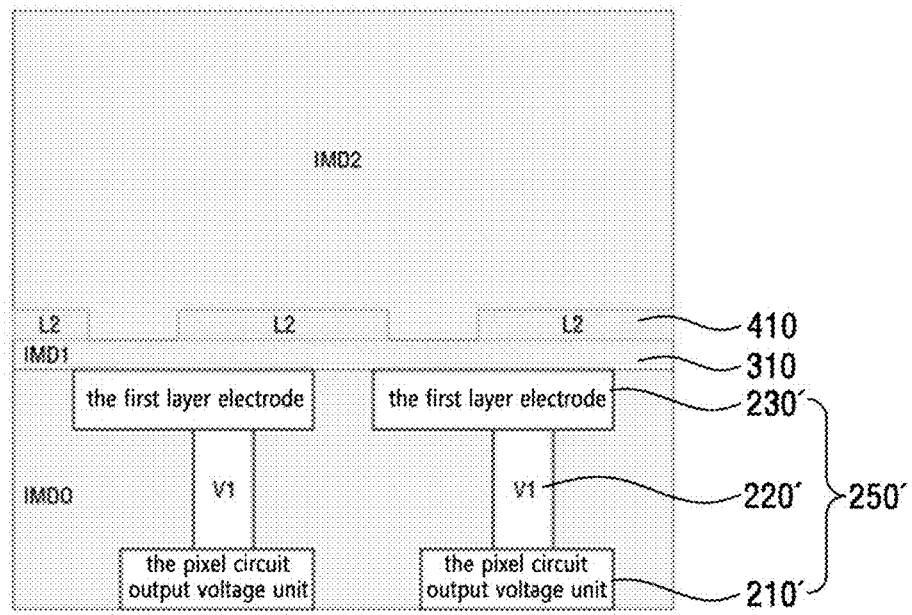

As illustrated in FIG. 13D, a third intermetallic dielectric IMD2 is deposited on the top surface of the pattern 410 and a portion of the top surface of the first intermetallic dielectric IMD0 in operation S250.

Figure 13E:
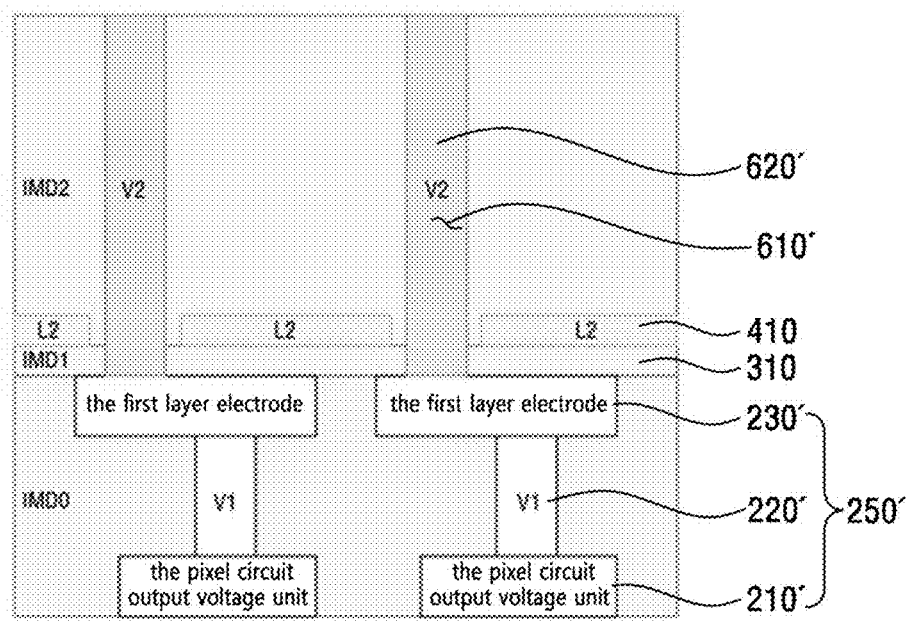

As illustrated in FIG. 13E, A plurality of second vias 610' connected to the top surface of the first layer electrode 230 are formed in the third intermetallic dielectric IMD2 in operation S260. The spaces of the plurality of second vias 610' are filled with metal materials such as tungsten, copper, and aluminum. Accordingly, a plurality of second columnar electrodes 620' are formed in operation S270.

Figure 13F:
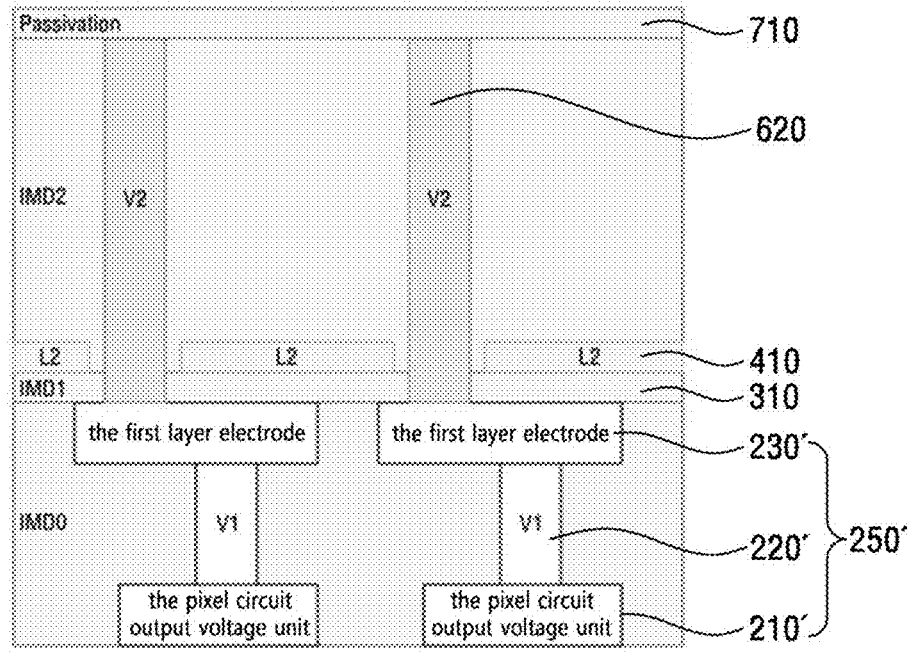

As illustrated in FIG. 13F, a protective film 710 is deposited on the top surface of the filled metal material 620 and the top surface of the third intermetallic dielectric IMD2 in operation S280.

Here, the protective film 710 is a dielectric. The protective film 710 is used to prevent the formation of an oxide film on the metal material 620 in the plurality of second vias.

Figure 13G:
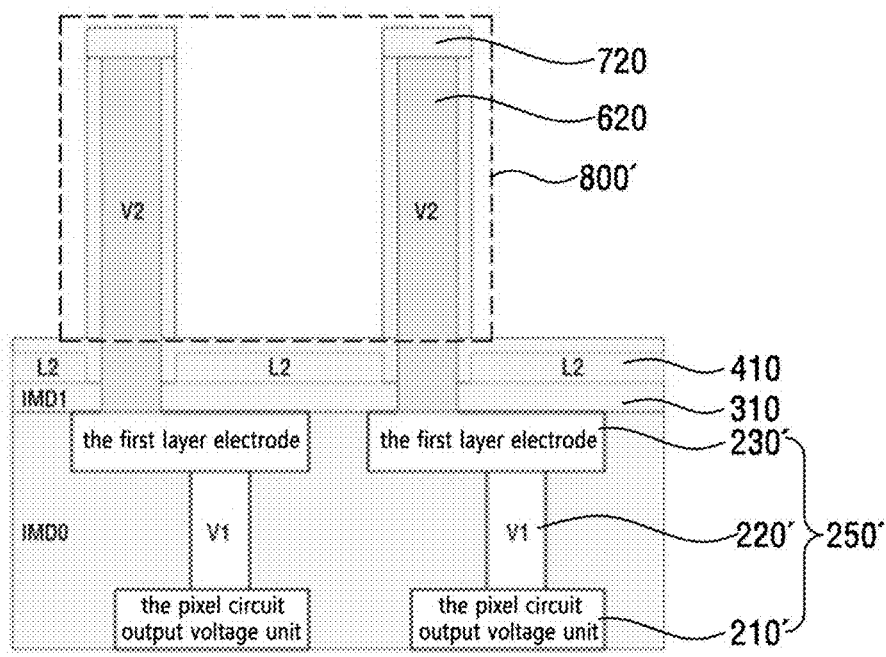

As illustrated in FIG. 13G, a portion of the top surface of the first intermetallic dielectric IMD0, both sides of the plurality of second vias 610, and both sides of the protective film 720 are selectively etched using a photography process so that they are exposed in operation S290.

The etched space is to secure space for liquid crystal injection.

As described above, the liquid crystal display of the micro display device according to the second embodiment of the present invention has a separate a plurality of first layer electrodes 230 that function as electric field driving electrodes, and a pattern 410 that functions as a reflective layer.

The above feature is different from the liquid crystal display of the micro display device according to the first embodiment of the present invention in which the plurality of first layer electrodes 230 simultaneously function as electric field driving electrodes and reflective layers.

Also, a difference between FIG. 13G and FIG. 10D is that the third intermetallic dielectric IMD2 layer is selectively liquid crystal etched so that the upper part of the plurality of second columnar electrodes 800 are formed into individual rod shapes.

Accordingly, an empty space due to liquid crystal etching exists between a plurality of second columnar electrodes 800. When assembling a liquid crystal cell, liquid crystal is injected into the empty space to create polarization phase modulation.

In this way, the present invention provides a liquid crystal display and manufacturing method of a micro display device capable of providing a liquid crystal display of a micro display device. The micro display device may remove the alignment layer or the processes and structures required for alignment using a liquid crystal driving method using a arbitrary electric field, and the upper plate reference electrode used in the vertical electric field driving method.

Through this, the present invention enables electric fields in arbitrary directions, thereby increasing the response speed of liquid crystal. The present invention not only simplifies the process by eliminating the need for an ITO layer and an alignment layer, but also prevents deterioration characteristics due to surface adsorption by impurities.

Also, as column-shaped or point-shaped electrodes are used instead of flat electrodes to implement arbitrary electric fields, the direction of the horizontal electric field is arbitrarily designated. Accordingly, the present invention prevents the problem of flat electrodes in which the formation of the desired electric field becomes weak or the phenomenon in which the desired electric field is not formed occurs.

Also, by additionally placing a plurality of columnar electrodes at the edge part of the display area, the adhesion between the lower driving substrate and the upper glass is significantly improved.

The method of manufacturing a liquid crystal display of a micro display device according to the present invention may be implemented in the form of program instructions that may be executed through various computer means and recorded on a computer-readable medium. A computer-readable recording medium may include program instructions, data files, data structures, etc., singly or in combination. Program instructions recorded on the medium may be specially designed and constructed for the present invention or may be known and available to those skilled in the art of computer software. Examples of computer-readable recording media comprise magnetic media such as hard disks, floppy disks, and magnetic tapes, optical media such as CD-ROMs and DVDs, and magneto-optical media such as floptical disks, and hardware devices specifically configured to store and execute program instructions, such as ROM, RAM, flash memory, etc. Examples of program instructions comprise machine language code, such as that produced by a compiler, as well as high-level language code that may be executed by a computer using an interpreter, etc.

The hardware devices described above may be configured to operate as one or more software modules to perform the operations of the present invention, and vice versa.

Also, although the above description focuses on examples, this is only an example and does not limit the present invention. Those of ordinary skill in the field to which the present invention pertains will recognize that various modifications and applications not exemplified above are possible without departing from the essential characteristics of the present embodiment. For example, each component specifically shown in the examples may be modified and implemented. And these variations and differences in application should be construed as being included in the scope of the present invention as defined in the appended claims.

DESCRIPTION OF THE REFERENCE NUMERALS 210, 210': Pixel circuit output voltage unit
220, 220': A plurality of first columnar electrodes
230, 230': First layer electrode
310: Insulating layer
410: Reflective layer
610, 610': A plurality of second vias
710: Protective film
800, 800': A plurality of second columnar electrodes
710: Protective film
800: A plurality of second columnar electrodes

The invention claimed is:

1. A liquid crystal display of a micro display device, comprising:
   a pixel driving circuit output electrode body in which a pixel circuit output voltage unit, a first columnar electrode, and a first layer electrode are sequentially stacked;
   a first intermetallic dielectric covering a side surface of the pixel driving circuit output electrode body;
   a pattern formed on a top surface of the first intermetallic dielectric;
   a second intermetallic dielectric stacked on a top surface of the first intermetallic dielectric and a top surface of the pattern;
   a second columnar electrode passing through the second intermetallic dielectric and connected to a top surface of the first layer electrode; and
   a protective film stacked on a top surface of the second columnar electrode and a top surface of the second intermetallic dielectric.

2. The liquid crystal display of claim 1,
   wherein as a dielectric, the protective film prevents an oxide film from being formed on the second columnar electrode.

3. The liquid crystal display of claim 1,
   wherein the first and second columnar electrodes are made of a metal material.

4. A liquid crystal display of a micro display device, comprising:
   a pixel driving circuit output electrode body in which a pixel circuit output voltage unit, a first columnar electrode, and a first layer electrode are sequentially stacked;
   a first intermetallic dielectric covering a side surface of the pixel driving circuit output electrode body;
   a pattern formed on a top surface of the first intermetallic dielectric;
   a second columnar electrode;
   a second intermetallic dielectric, wherein the second columnar electrode is connected to a top surface of the first layer electrode through penetrating the second intermetallic dielectric, and the second intermetallic dielectric covers a side surface of the second columnar electrode and a top surface of the pattern; and
   a protective film covering a top surface of the second columnar electrode.

5. The liquid crystal display of claim 4,
   wherein as a dielectric, the protective film prevents an oxide film from being formed on the second columnar electrode.

6. The liquid crystal display of claim 4,
   wherein the first and second columnar electrodes are made of a metal material.

7. A liquid crystal display of a micro display device, comprising:
   a pixel driving circuit output electrode body in which a pixel circuit output voltage unit, a first columnar electrode, and a first layer electrode are sequentially stacked;
   a first intermetallic dielectric covering a side surface of the pixel driving circuit output electrode body;
   a second intermetallic dielectric stacked on a top surface of the first layer electrode and a top surface of the first intermetallic dielectric;
   a pattern formed on a top surface of the second intermetallic dielectric;
   a third intermetallic dielectric stacked on a top surface of the second intermetallic dielectric and a top surface of the pattern;
   a second columnar electrode passing through the second and third intermetallic dielectrics and connected to a top surface of the first layer electrode; and
   a protective film stacked on a top surface of the second columnar electrode and the upper surface of the third intermetallic dielectric.

8. The liquid crystal display of claim 7,
   wherein as a dielectric, the protective film prevents an oxide film from being formed on the second columnar electrode.

9. The liquid crystal display of claim 7,
   wherein the first and second columnar electrodes are made of a metal material.

10. A liquid crystal display of a micro display device, comprising:
    a pixel driving circuit output electrode body in which a pixel circuit output voltage unit, a first columnar electrode, and a first layer electrode are sequentially stacked;
    a first intermetallic dielectric covering a side surface of the pixel driving circuit output electrode body;
    a second intermetallic dielectric stacked on a top surface of the pixel driving circuit output electrode body and a top surface of the first intermetallic dielectric;
    a pattern formed on at least a portion of a top surface of the second intermetallic dielectric;
    a second columnar electrode;
    a third intermetallic dielectric, wherein the second columnar electrode is connected to a top surface of the first layer electrode through penetrating the second intermetallic dielectric and the third intermetallic dielectric, and the third intermetallic dielectric covers a side surface of the second columnar electrode and a top surface of the pattern; and
    a protective film covering a top surface of the second columnar electrode.

11. The liquid crystal display of claim 10,
    wherein as a dielectric, the protective film prevents an oxide film from being formed on the second columnar electrode.

12. The liquid crystal display of claim 10,
wherein the first and second columnar electrodes are made of a metal material.

13. A method of manufacturing a liquid crystal display, comprising:
- (a) forming a pixel driving circuit output electrode body by sequentially stacking a pixel circuit output voltage unit, a first columnar electrode, and a first layer electrode;
- (b) depositing a first intermetallic dielectric to cover a side surface of the pixel driving circuit output electrode body;
- (c) depositing a second intermetallic dielectric on a top surface of the first layer electrode and a top surface of the first intermetallic dielectric;
- (d) forming a pattern on at least a portion of the top surface of the first intermetallic dielectric while exposing at least a portion of the top surface of the first layer electrode;
- (e) depositing a third intermetallic dielectric on a top surface of the second intermetallic dielectric exposed by the pattern and on a top surface of the pattern;
- (f) forming a second via that penetrates the third intermetallic dielectric and the top surface of the second intermetallic dielectric exposed by the pattern and is connected to the top surface of the first layer electrode;
- (g) filling the inside of the formed second via with a metal material; and
- (h) depositing a protective film on a top surface of the filled metal material and the second intermetallic dielectric.

14. The method of claim 13,
wherein step (a) comprises:
- depositing a first intermetallic dielectric on the pixel circuit output voltage unit;
- forming a first via having one side connected to the top surface of the pixel circuit output voltage unit among the deposited first intermetallic dielectrics; and
- depositing the first layer electrode layer on the other side of the first via.

15. The method of claim 13, further comprising, after step (h), selectively etching the second intermetallic dielectric and the protective layer to an extent that the top surface of the pattern and the metal material are not exposed.

16. The method of claim 13, wherein in step (h), the protective film that is a dielectric prevents an oxide film from being formed on the metal material.

17. A computer-readable recording medium of a method of manufacturing a liquid crystal display,
wherein the computer-readable recording medium records a program for performing the method of claim 13 on a computer.

* * * * *